(12) United States Patent
Bechtolsheim et al.

(10) Patent No.: US 7,573,916 B1
(45) Date of Patent: Aug. 11, 2009

(54) MULTI-FUNCTION HIGH-SPEED NETWORK INTERFACE

(75) Inventors: Andreas V. Bechtolsheim, Stanford, CA (US); Howard M. Frazier, Pleasanton, CA (US); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 919 days.

(21) Appl. No.: 10/804,349

(22) Filed: Mar. 17, 2004

Related U.S. Application Data

(63) Continuation of application No. 09/339,963, filed on Jun. 25, 1999, now Pat. No. 6,956,852.

(51) Int. Cl.
H04J 3/02 (2006.01)
H04L 12/56 (2006.01)
H04L 12/66 (2006.01)
H04Q 11/00 (2006.01)

(52) U.S. Cl. ............... 370/542; 370/419; 370/463; 370/359

(58) Field of Classification Search ............... None
See application file for complete search history.

(56) References Cited

U.S. PATENT DOCUMENTS

| | | | |
|---|---|---|---|
| 4,383,316 A * | 5/1983 | Seidel | 370/536 |
| 4,703,475 A * | 10/1987 | Dretzka et al. | 370/394 |
| 4,864,303 A | 9/1989 | Ofek | |
| 4,958,344 A | 9/1990 | Scott | |
| 5,065,396 A * | 11/1991 | Castellano et al. | 370/536 |
| 5,293,378 A * | 3/1994 | Shimizu | 370/474 |
| 5,317,415 A * | 5/1994 | Kinami et al. | 358/425 |
| 5,426,644 A * | 6/1995 | Fujimoto | 370/535 |
| 5,561,771 A * | 10/1996 | Harriman et al. | 709/228 |
| 5,566,193 A | 10/1996 | Cloonan | |
| 5,570,356 A * | 10/1996 | Finney et al. | 370/476 |
| 5,587,709 A | 12/1996 | Jeong | |
| 5,625,563 A | 4/1997 | Rostoker et al. | |
| 5,648,776 A * | 7/1997 | Widmer | 341/100 |
| 5,675,584 A | 10/1997 | Jeong | |
| 5,680,400 A * | 10/1997 | York | 370/473 |
| 5,715,252 A * | 2/1998 | Sato | 370/543 |
| 5,764,895 A * | 6/1998 | Chung | 709/250 |
| 6,081,523 A * | 6/2000 | Merchant et al. | 370/389 |
| 6,094,439 A * | 7/2000 | Krishna et al. | 370/445 |
| 6,496,540 B1 * | 12/2002 | Widmer | 375/242 |
| 6,591,303 B1 * | 7/2003 | Hendel et al. | 709/238 |
| 6,603,768 B1 * | 8/2003 | Bleszynski et al. | 370/397 |
| 6,618,395 B1 * | 9/2003 | Kimmitt | 370/473 |
| 6,873,630 B1 * | 3/2005 | Muller et al. | 370/356 |

* cited by examiner

*Primary Examiner*—Chi H Pham
*Assistant Examiner*—Warner Wong
(74) *Attorney, Agent, or Firm*—File-EE-Patents.com; Jay A. Chesavage

(57) ABSTRACT

A high speed communications interface divides data into a plurality of lanes, each lane encoded with clocking information, serialized, and sent to an interface. During cycles when there is no available data to send, IDLE_EVEN and IDLE_ODD cells are sent on alternating cycles. Data is transmitted by sending a header which spans all lanes and includes a START symbol. The final data transaction includes a Frame Check Sequence (FCS) which operates over the entire header and data. The packet is terminated by an END symbol, which is sent after the final data, and the remainder of the lanes are padded with IDLE_EVEN, IDLE_ODD, IDLE_EVEN_BUSY, or IDLE_ODD_BUSY cycles. The interface has a variable clock rate.

46 Claims, 11 Drawing Sheets

Ethernet Packet

IP Payload

ATM Cell

GX Packet Format

GX Header

GX Data Stream

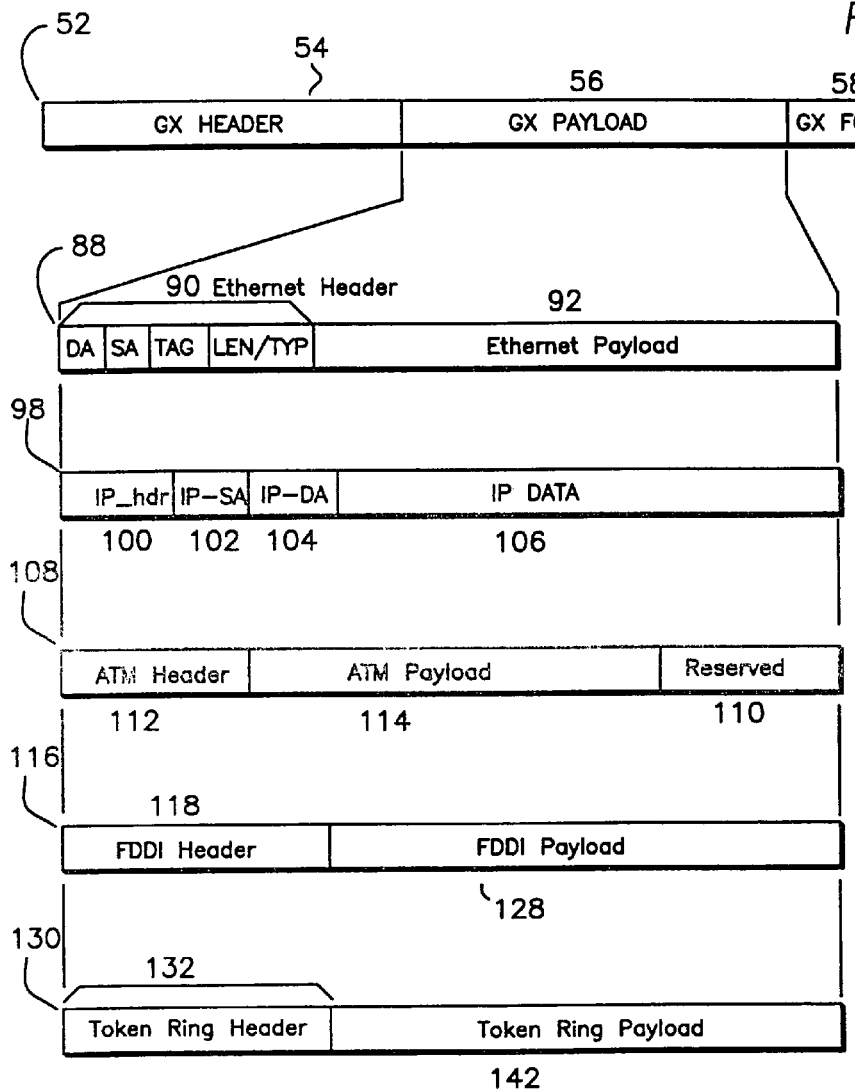

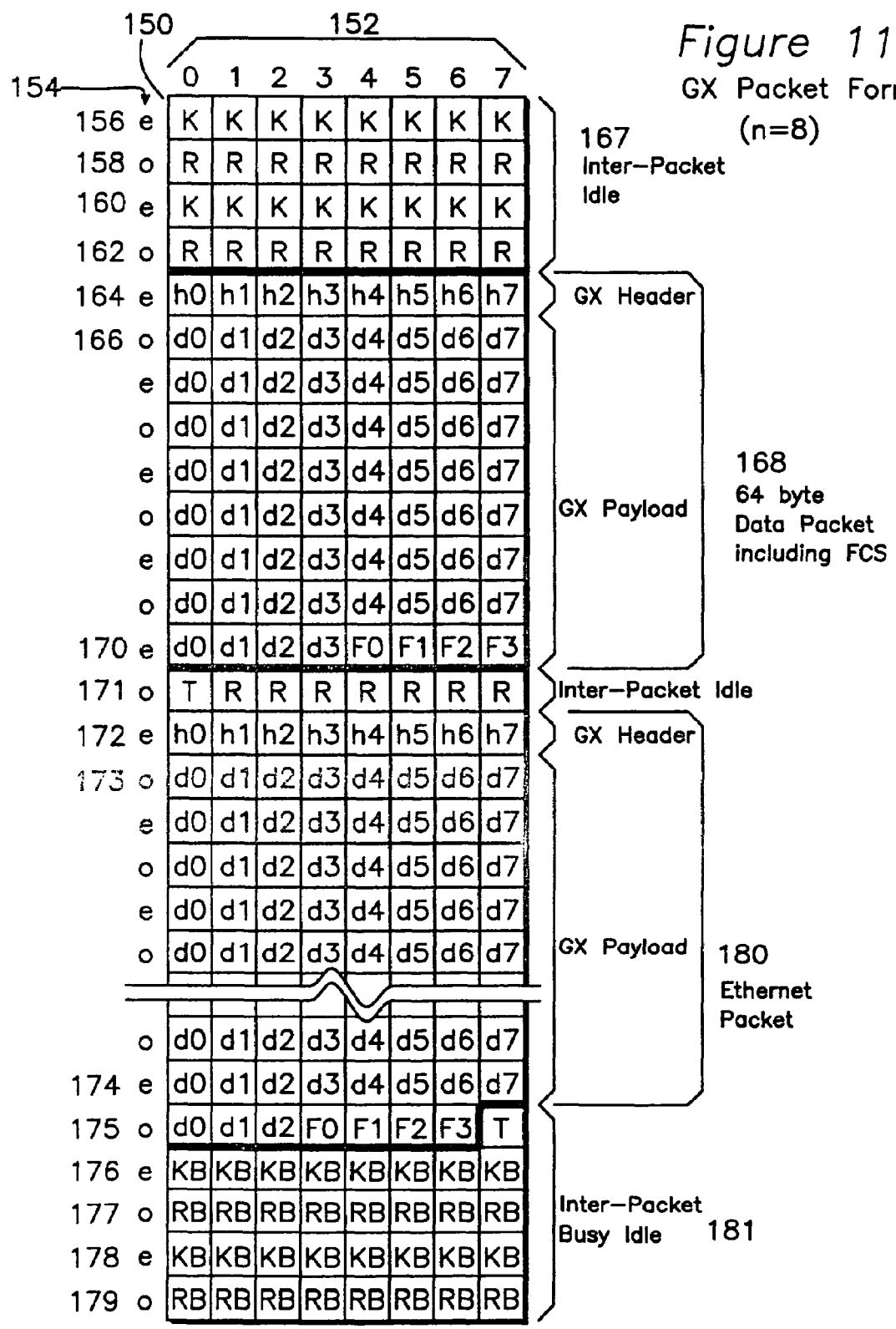

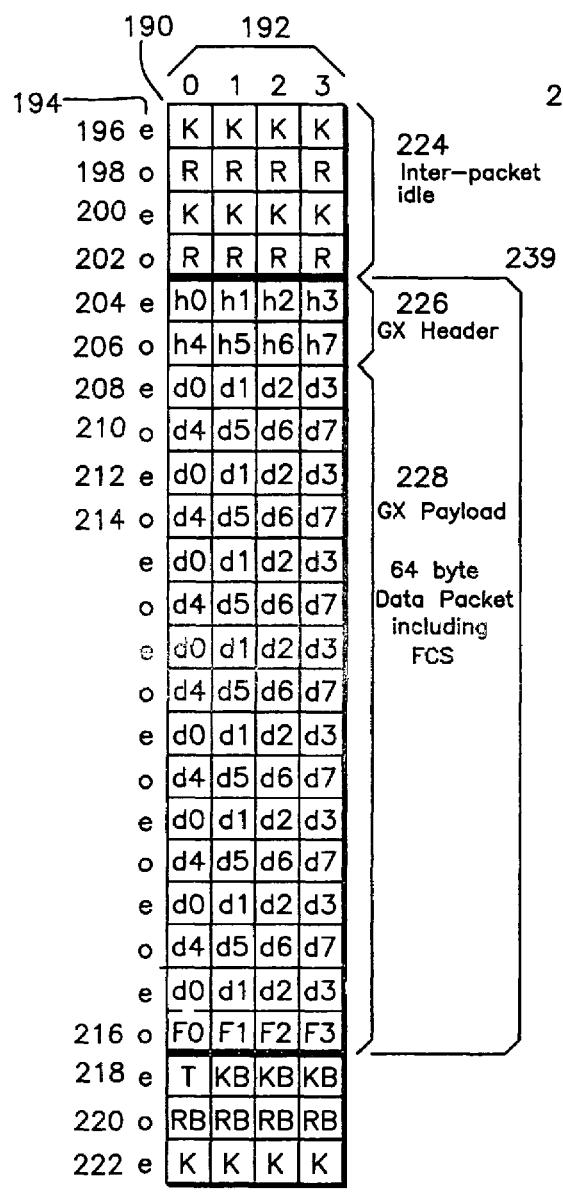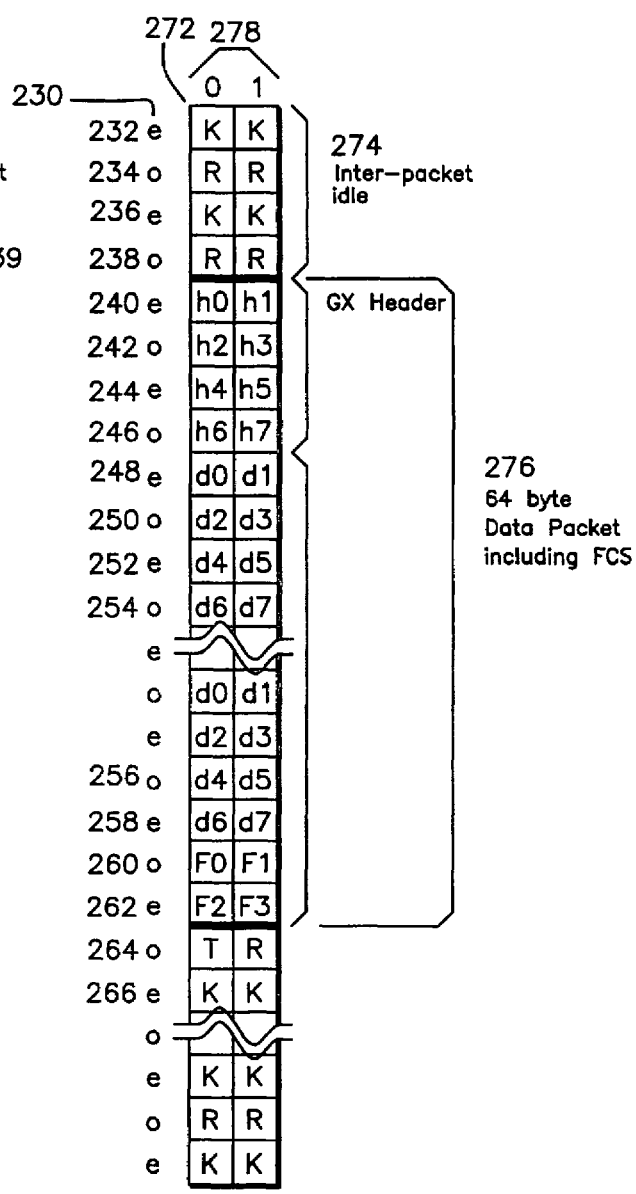

GX Packet Format (n=1)

Transmit Processor (n=4)

8B/10B Encoder

8B/10B Encoder

| | 8B Input | Ctrl Input | 10B Output |
|---|---|---|---|
| 440 | START | CTRL | Start |
| 442 | 8B_Data | DATA | 10B_Data |
| 444 | END | CTRL | End |
| 446 | IDLE-EVEN | CTRL | Even_Idle |
| 448 | IDLE-ODD | CTRL | Odd_Idle |
| 449 | IDLE-EVEN_BUSY | CTRL | Even_Idle_Busy |
| 450 | IDLE-ODD_BUSY | CTRL | Odd_Idle_Busy |

Receive Processor (n=8)

Receive Processor (n=4)

10B/8B Decoder

10B/8B Decoder

|     | 10B Input | 8B Output | Ctrl Output |
|-----|-----------|-----------|-------------|
| 470 | Start | START | CTRL |
| 472 | 10B_Data | 8B_Data | DATA |
| 474 | End | END | CTRL |
| 476 | Even_Idle | IDLE-EVEN | CTRL |
| 478 | Odd_Idle | IDLE-ODD | CTRL |
| 480 | Even_Idle_Busy | IDLE-EVEN-BUSY | CTRL |
| 482 | Odd_Idle_Busy | IDLE-ODD-BUSY | CTRL |

MULTI-FUNCTION HIGH-SPEED NETWORK INTERFACE

This is a continuation of U.S. patent Ser. No. 09/339,963, now U.S. Pat. No. 6,956,852, filed Jun. 25, 1999.

FIELD OF THE INVENTION

The current data communication invention is directed to a high speed network interface that is capable of the transmission and reception of multiple types of variable length data packets. In addition, the invention includes a media access control mechanism. Data packets can be sent over a variety of physical media, including single mode fiber, multi-mode fiber, and parallel fibers.

BACKGROUND OF THE INVENTION

In data communications networks, a large number of methods are used to encapsulate communication data packets such as OSI (Open Systems Interconnect) layer 3 TCP/IP packets for the purpose of transmission over local or layer 2 networks and over specific point to point layer 1 physical links. Examples of OSI layer 2 network encapsulation and transmission and access control methods include 10 Mb Ethernet, 100 Mb Ethernet, gigabit Ethernet (IEEE 802.3z), IEEE 802.1Q, IEEE 802.3x, FDDI (ANSI X3T9.5), and token ring (IEEE 802.5). There are also a large number of methods to encapsulate layer 3 packets for transmission over layer 2 networks. For point to point links, available encapsulations include PPP over HDLC (RFC1661), and Packet over Sonet (IETF RFC1619).

In a generic Ethernet packet, the header information that is immediately needed for a switching decision is the layer 2 media access control (MAC) source and destination addresses and, optional 802.1Q tag information. For an IP packet, routing information is contained in the IP source and destination addresses. The MAC source and destination addresses are used for layer 2 switching, wherein the destination address is matched with the port having previously received a source address of the same value. The layer 2 source and destination information is readily available in the first 12 bytes of the Ethernet packet, and generally presents no challenge in extraction. Higher level layer 3 Internet Protocol (IP), and other types of protocol packets present somewhat greater difficulty. For IP, a 32 bit IP source and 32 bit IP destination address are needed for the routing decision, and the hardware must go through a decision tree to determine what type of packet is being examined, what protocol type it is, and thereafter extract addressing information. Virtual Local Area Network (VLAN) information may be added indicating which VLAN the packet has membership. Each switch keeps a copy of a table with the VLAN value associated with a port of exit. When a packet bearing this VLAN value arrives, a hardware-based lookup is performed into a table, which yields the associated port of exit for the packet. If the decision tree determines that the packet is not of a supported type, then the treatment reverts back to the layer 2 switching treatment of a simple Ethernet packet, and the time spent examining the packet is lost. Additionally, for each separate protocol, such as IP, IPX, Appletalk, etc., this examination of the packet must occur, and the information will appear in different places and formats in the packet. It would be useful to have a single method of access for the transmission and reception of switching and routing information for such data packets including a common header format.

OBJECTS OF THE INVENTION

A first object of the invention is to provide a packet encapsulation that includes a start symbol and a type field which provides for the encapsulation of a variety of data packet types, including Ethernet, FDDI, Token Ring, ATM cells, and others.

A second object of the invention is a packet encapsulation that provides for layer 2 prioritization and virtual LAN information for any type of data packet.

A third object of the invention is the provision of a header field which allows application specific packet information in addition to the payload.

A fourth object of the invention is the provision of a CRC that includes the header and payload of the packet.

A fifth object of the invention is to provide for data transmission at a variety of speeds.

A sixth object of the invention is the provision of a flow control mechanism to the media as indicated by the receiver.

A seventh object of the invention is to allow data transmission in a variety of encodings in a transmission and reception media, including a serial channel, as well as any number of parallel channels.

SUMMARY OF THE INVENTION

The present invention comprises a method for encoding and decoding data referred to as GX packets, a transmit processor, and a receive processor. The transmit processor includes a transmit buffer/controller dividing the data into a plurality of transmit data lanes, a plurality of transmit encoders, each encoder accepting information from a unique transmit data lane and producing an output stream of clock-encoded data, and a plurality of transmit serializers, each accepting a unique stream of transmit encoded data, and serially encoding it for transmission. A variable-speed transmit clock circuit affords clocking of the elements of the transmit processor. The transmit encoders add clock recovery information to the data stream, optionally using the 8B/10B encoding method, and also insert START, END, IDLE_EVEN, IDLE_ODD, IDLE_EVEN_BUSY, and IDLE_ODD_BUSY information as instructed by the input buffer/controller. The receive processor comprises a plurality of receive deserializers, each receiving a serial stream of encoded data, and producing a stream of parallel encoded data. These encoded parallel streams are passed on to a plurality of receive decoders, each of which decodes a stream of encoded data into a stream of byte information, as well as decoding control information such as START, END, IDLE_EVEN, IDLE_ODD, IDLE_EVEN_BUSY, and IDLE_ODD_BUSY. The receive processor/controller accepts these streams of data and control signals, organizes the recovered byte streams into recovered packets, and also reports errors associated with the data recovery process. A recovered receive clock for each data lane is used to clock synchronized data into the elasticity buffer of the receive processor.

BRIEF DESCRIPTION OF THE DRAWINGS

FIG. 5 shows the GX packet format with payload details.

FIG. 6 shows the case where the GX payload is an Ethernet packet.

FIG. 7 shows the case where the GX payload is a native IP packet.

FIG. 8 shows the case where the GX payload is an ATM cell.

FIG. 9 shows the case where the GX payload is an FDDI packet.

FIG. 10 shows the case where the GX payload is a Token Ring packet.

FIG. 11 shows the GX packet format where the data is transmitted and received across 8 data lanes.

FIG. 12 shows the GX packet format where the data is transmitted and received across 4 data lanes.

FIG. 13 shows the GX packet format where the data is transmitted and received across 2 data lanes.

FIG. 17a shows the 8B/10B encoder.

FIG. 17b shows the encoding scheme for the encoder of FIG. 17a.

FIG. 20a shows the 10B/8B decoder.

FIG. 20b shows the decoding scheme for the decoder of FIG. 20a.

DETAILED DESCRIPTION OF THE INVENTION

Figure 1:
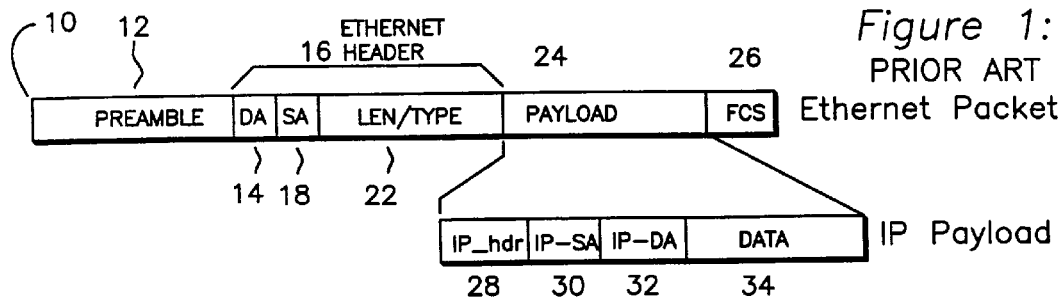
FIG. 1 is a prior art IEEE 802.3 Ethernet Packet including an IP payload.

FIG. 1 shows a prior art layer 2 Ethernet Packet 10, comprising a preamble 12, a header 16 comprising a MAC Destination Address 14, a MAC Source Address 18, and length/type information 22. Payload 24 is followed by the Frame Check Sequence 26 which is a Cyclical Redundancy Check (CRC) polynomial applied over the entire Ethernet header 16 and payload 24. For a generic layer 2 Ethernet packet, payload 24 contains the data. In the case of a layer 3 protocol such as IP, payload 24 is arranged to further comprise an IP header 28, an IP source address 30, and an IP destination address 32, followed by the IP data 34. Other layer 3 protocols such as Appletalk, IPX, and the like have alternate arrangements for payload 24, but in general carry a layer-related source and destination address observed by the particular protocol. Other attributes of Ethernet packet 10 include variable length payload 24, which may vary from 46 bytes to 1500 bytes, as defined in the MAC layer specification IEEE 802.3. The general attributes of prior art packets as described in FIG. 1 include both layer 2 (MAC) and layer 3 (network) source and destination addresses, and variable length data 24. These are used individually, or in combination, by network switches and routers to forward packets across layer 2 subnets, and represents information for which the switching hardware generally needs immediate access for the switching/routing decision.

Figure 2:
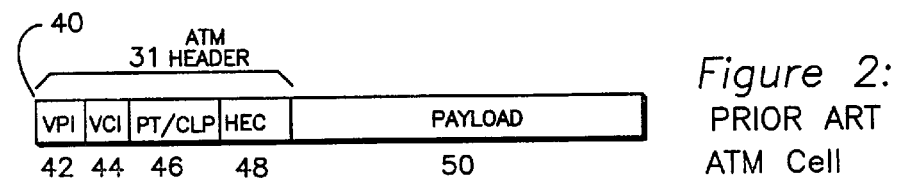
FIG. 2 is a prior art ATM cell.

FIG. 2 shows an ATM cell 40 generally used in an ATM switching network. ATM networks set up end-to-end connections according to ATM Forum User Network Interface (UNI 3.1) protocols prior to the transmission of actual network data. The characteristic of ATM cells is a fixed 53 byte cell comprising a 5 byte ATM header 31 and a 48 byte 7 payload 50. The header contains an 8 bit VPI (virtual path 8 index) 42 and a 16 bit VCI (virtual circuit index) 44, which 9 is locally assigned and kept as an index into a look-up table which associates an exit port with this index.

Figure 3A:
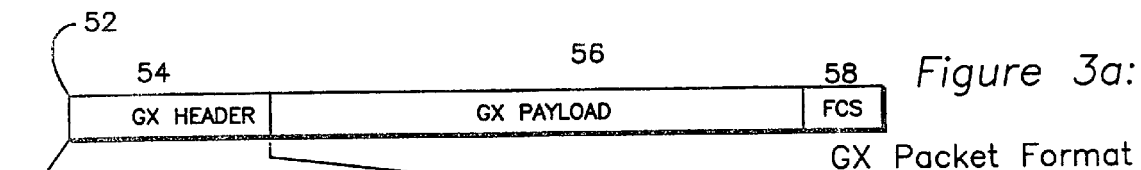
FIG. 3a shows the GX packet format with header details.

FIG. 3a shows the GX packet format for the present invention. GX packet 52 comprises a GX header 54, a GX payload 56, and a Frame Check Sequence (FCS) 58, which operates over the entire GX header 54 and GX payload 56

Figure 3B:
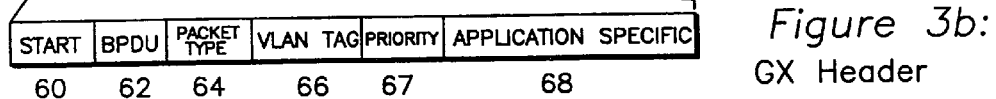
FIG. 3b shows the header for the GX packet.

FIG. 3b shows the details of the GX header of FIG. 3a. GX header 54 includes a START symbol 60. BPDU field 62 is a Bridge Protocol Data Unit field, which flags the following data as configuration information used by the spanning tree algorithms such as IEEE 802.1D, or other configuration information which needs to be given higher priority against packet loss during times of network congestion. Packet type field 64 indicates the type of GX payload data, such as ATM cell, Ethernet, FDDI, etc. VLAN field 66 contains VLAN information, PRIORITY field 67 indicates priority information, and Application Specific field 68 allows for the optional transmission of information specific to the needs of the data communication system.

Figure 4:
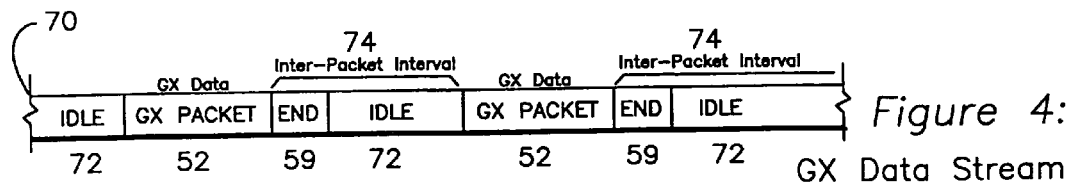
FIG. 4 shows a data stream including packets and inter-packet intervals.

FIG. 4 shows a GX data stream 70 comprising a plurality of GX packets 52, each followed by an inter-packet interval 74 which comprises an END 59 symbol and a variable amount of IDLE 72 time. The END symbol 59 immediately follows the GX FCS 58 of the preceding GX packet 52, and the variable IDLE 72 time allows for the continuous synchronization of the receiver during times when data is not being transmitted.

FIG. 5 shows examples of different GX payload 56 formats, illustrated by the FIGS. 6 through 10.

FIG. 6 shows the GX payload 56 as a prior art Ethernet packet, comprising Ethernet header 90, and Ethernet payload 92. The Ethernet FCS 26 is not transmitted, since the GX FCS 58 serves this error checking function in GX links.

FIG. 7 shows a native IP payload comprising an IP frame 98 having an IP header 100, IP source address 102, IP destination address 104, and IP data 106.

FIG. 8 shows the GX payload 56 comprising an ATM format 108 including a reserved field 110, ATM header 112, and ATM payload 114. The optional reserved field 110 may occur before the ATM header 112 or after the ATM payload 114.

FIG. 9 shows the GX payload 56 comprising an FDDI format 116, including FDDI header 118, and FDDI payload 128.

FIG. 10 shows the GX payload 56 comprising a Token Ring format 130 including a Token Ring header 132 and Token Ring payload 142.

Each of the GX payloads 56 as described in FIGS. 6,8,9, and 10 is associated with a particular GX header type field value 64. The objective of field value 64 is to provide knowledge of the type and format of the associated GX payload data. It is clear to one skilled in the art that it is possible to add support for additional payload format types through the assignment of header type 64 beyond those discussed here, and the use of specific GX payload types described herein are not intended to limit the application of field types to only these examples used for illustration.

FIG. 11 shows the GX packet format for the case where the number of data lanes 152 n=8. Data from the GX packet 52 is distributed across 8 data lanes identified by the columns 0 through 7 of 152. Time intervals are identified alternately as odd (o) and even (e) as shown in column 154. K symbols are sent during even cycles, and R symbols sent during odd cycles, as represented by rows 156 and 158, respectively. This alternating sequence continues during inter-packet idle time 167, serving as the variable length inter-packet interval 74. The GX packet 168 comprises GX header 164 and GX payload, starting at row 166, and ending at row 170. Data is instantaneously transmitted from column 0 through column 7, row by row, until the final 4 byte FCS 58 is sent, as noted by F0, F1, F2, and F3 in row 170, which is the end of the GX packet 52. The T symbol of row 171 indicates the end of transmission, and the remainder of the data lanes are filled with odd idle symbol R. The following Ethernet packet 180 of FIG. 11 comprises GX header 172 followed by data, the FCS, and an END symbol in rows 173 through 175. If the receiver for the link were busy, the BUSY_IDLE symbols KB and RB would be sent during the inter-packet period 181 from END symbol T on column 7 of line 175 followed by BUSY_IDLE symbols on line 176 through 179.

The algorithm used in transmission is as follows:
1) Packet data is divided across n data lanes.
2) Upon startup, each of data lanes 0 though n−1 sends idle symbols alternately coded K during even cycles, and R during odd cycles. The number of these initial startup idle packets is $N_{idle}$, and their purpose is to gain synchronization of the receiver prior to sending data. If the receiver of the link is busy, and unable to receive additional data, it signals this with the code KB during even cycles, and RB during odd cycles.
3) When a data packet is ready for transmission, a header is sent including the start symbol S on the first data lane, and remainder of the header on the remaining data lanes. The GX header includes information which declares the format of the packet data of the GX payload.
4) Across all data lanes, data is sequentially sent up to, but not including, the last lane-wide data transfer.
5) On the last lane-wide data transfer, the end of packet symbol T is sent on the data lane following the last valid data byte, and the balance of the data lanes is filled with K for even cycles, or R for odd cycles. If the receiver for the link is unable to receive new data, KB is sent during even cycles, and RB is sent during odd cycles.
6) Until the availability of the next complete packet for transmission, the symbol K is sent during even cycles and R is sent during odd cycles across all data lanes. During the time the receiver is unable to receive new data, KB is sent during even cycles, and RB is sent during odd cycles. Additionally, a sequence of at least 32 bytes is sent at least once every $n_{elasticity}$ data bytes to accommodate clocking differences between systems. The value of $n_{elasticity}$ is determined by the difference in clock frequency between systems, and is typically $2^{15}$ bytes or greater.

In the example of FIG. 11, a link is initialized with the transmission of a minimum number of idle patterns which are transmitted by all data lanes during even cycles as the symbol K and during odd cycles as the symbol R. This idle pattern continues a minimum time to enable symbol synchronization in the receiver. This enables the receiver to acquire lock, and the symbol decoders to operate for an interval on synchronization data, as well as to decode their separate version of odd/even, which the receiver will need for symbol decoding. In this example, a 64 byte Ethernet packet 168 is sent, comprising header 164, and data rows 166 through 170, followed by END symbol T and IDLE_ODD R symbols of row 171. Since the last data symbol occurs on the final data lane of 170, data row 171 has the END symbol T sent on data lane 0, and the remainder of the data lanes carry the IDLE_ODD symbol R. The next packet sent is Ethernet packet 180, comprising header 172, and data 173 through 175. In this case, the END symbol is sent on the last data lane during the last data transfer 175, which is data lane 7 for the present case of n=8.

FIG. 12 shows the GX packet format for the case where the number of data lanes n=4. As before, the data is presented to data lanes 192, and the frame comprises inter-packet idle pattern 224 which alternates during odd and even cycles of 196, 198, 200, and 202. The GX header is now sent over two cycles starting with the Start symbol in HO of 204, followed by the balance of the header in second cycle 206. The GX payload 228 is sent from cycles 208 through FCS 216 and END symbol T in line 218. Cycles 218 and 220 show a busy receiver, as BUSY_IDLE_EVEN KB and BUSY_IDLE_ODD RB are sent. The following cycle 222 signals an even cycle with the receiver no longer busy.

FIG. 13 shows the GX packet format for the case where the number of data lanes n=2. For this case, the GX header and GX data are distributed across the available data lanes, as shown.

Figure 14:
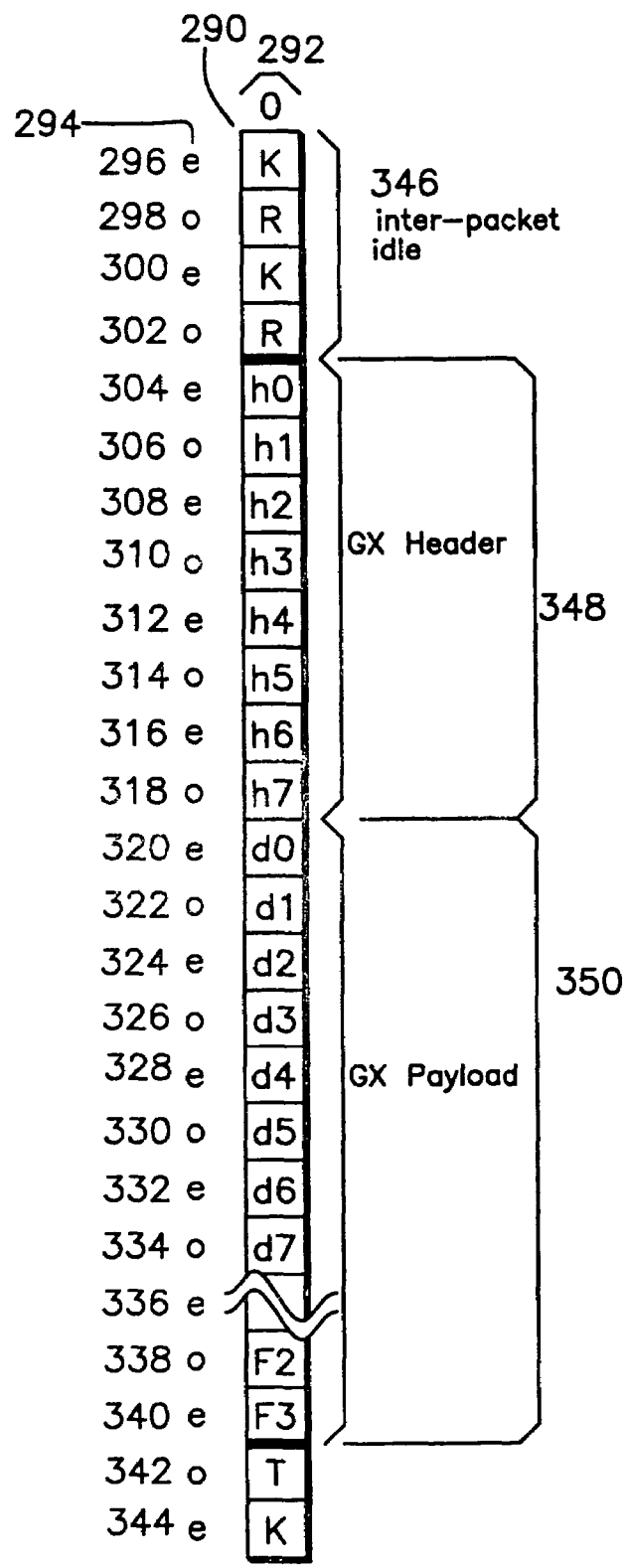
FIG. 14 shows the GX packet format where the data is transmitted and received across 1 data lane.

FIG. 14 shows the serial case of n=1, where only one data lane is used. As before, IDLE_ODD and IDLE_EVEN cycles are shown during the inter-packet idle interval 346, and the GX header is sent over 8 cycles as shown in 348, and the GX payload is sequentially sent from 320 through 340, followed by the END symbol T in row 342.

It is clear to one skilled in the art that in the previous illustrations for various numbers of byte lanes that the assignment of a particular data byte stream to a particular byte lane is arbitrary, and the sequential assignment shown herein is for illustration only.

Examining the header for each of the previous FIGS. 11, 12, 13, and 14, FIG. 3b shows the header format typically used by each of the previous examples. For the present example, where 8 data lanes are used, the header 54 comprises the following bit fields:
an 8 bit START symbol 60;
a single bit BPDU field 62;
a 7 bit type field 64 indicating the type of data carried (Ethernet, Token Ring, FDDI, ATM, IP, etc);
a 12 bit VLAN field;
a 3 bit priority field;
a 1 bit reserved field;

a 32 bit application specific field 68 for future expansion. Alternatively, application specific field 68 may contain information that is specific to a particular protocol. The information in the GX header 54 is generally useful to the router or switch in the extraction of early information about the nature and handling of the information to be processed. The type field 64 is used to declare whether the payload data is Ethernet, ATM, or some other type, and the data that follows is used in a context specific to the type declaration 64. In the particular example, a BPDU bit 62 can be set which ensures that BPDUs (Bridge Protocol Data Unit) used for Spanning Tree Protocol described in IEEE 802.1D properly arrive. Often in networks that are congested because of a reconfiguration event (equipment that has recently failed, or is being added or removed), BPDUs without such priority treatment and which are essential to the reconfiguration of the network are lost, or blocked from transmission. By including this information in the header, they may be granted priority over ordinary data packets.

Figure 15:
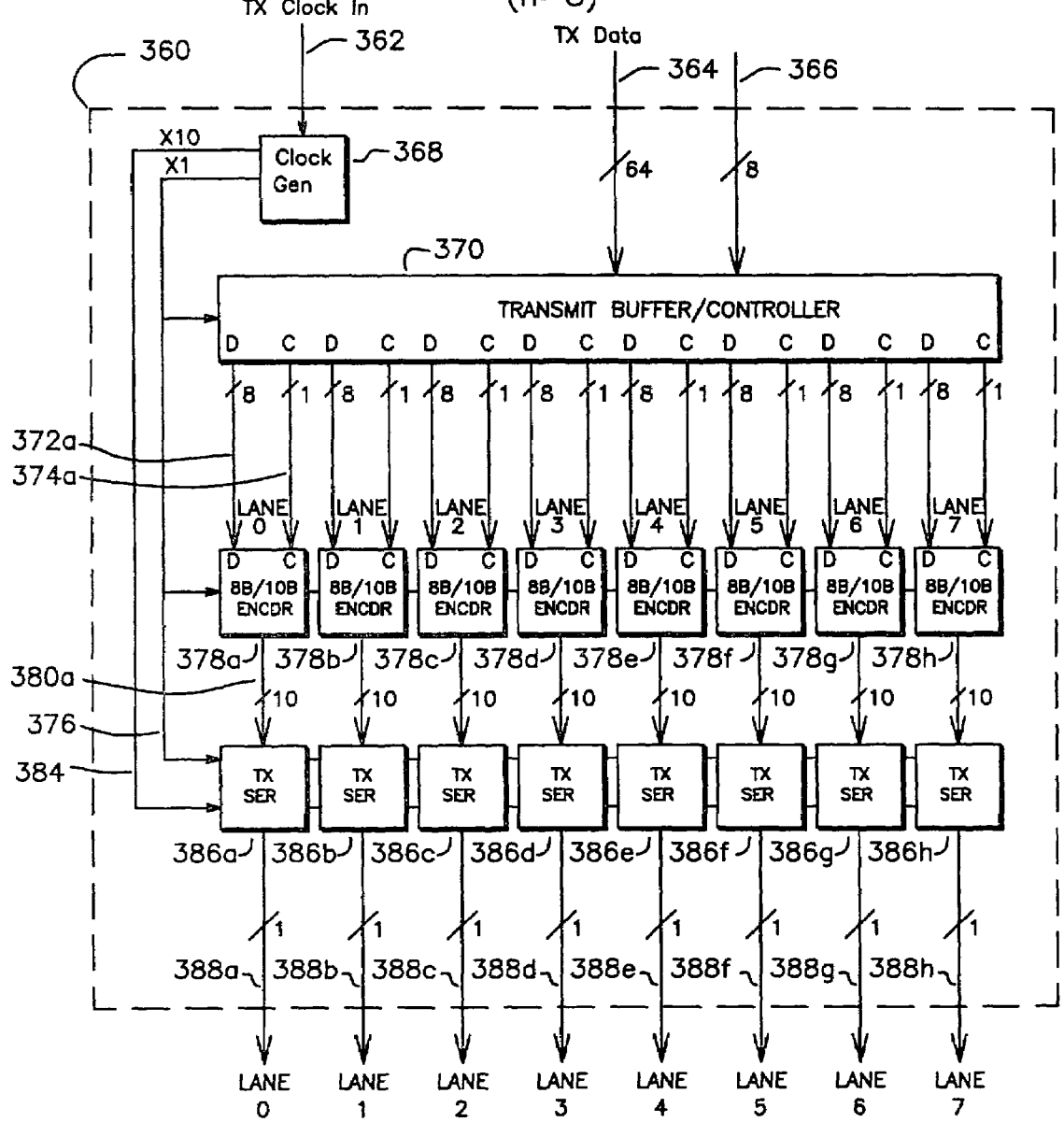
FIG. 15 is an 8 data lane transmit processor for the packet of FIG. 11.

FIG. 15 shows a block diagram of the transmit processor 360. Input packets arrive via input interface 364 to transmit buffer/controller 370 accompanied by control/data bits 366. Data is arranged in byte order across output ports 0 through n−1, shown for the instance where n=8 having data lanes 0 through 7. In addition to data outputs, the transmit buffer/controller also outputs control information for each data lane. Each data lane is controlled by a single control signal such as 374a for lane 0, and accompanied by transmit data such as 372a. During the times that control symbols are emitted, such as START, IDLE, IDLE_BUSY, and END, the control input is asserted true, and the associated 8 bit data indicates which special 10B control symbol should be emitted. During the time that the control signal is not asserted, the incoming data is encoded using the prior art 8B/10B coding rule, as will be described later. When IDLE cells are to be output, the encoders across all data lanes are set to alternate between IDLE_EVEN and IDLE_ODD. During the first cycle of a packet transmit, the transmit buffer/controller outputs START on control lane 0. Lanes 1 through 7 carry the balance of the GX Header information. During the last cycle of transmit, all of the lanes up to the final data byte have control signals set to DATA, and data is sent on these data lines. The following lane has its control and data lines set for END, and the remaining lanes have their control and data lines set for IDLE_EVEN, or IDLE_ODD, depending on whether they occur on an even or odd cycle. Encoders 378*a* through 378*h* accept this control signal accompanied by data. During the times the control input is DATA, this data is encoded from 8B to 10B as described in the 8B/10B coding scheme of U.S. Pat. No. 4,486,739. During the times the control input is CONTROL, the data input is interpreted to produce control codes such as IDLE_EVEN, IDLE_ODD, START, and END. The 10B encoded data is input to transmit serializers 386*a* through 386*h*, and are output as serial data organized by data lanes 388*a* through 388*h*. These outputs are typically fed through an optical or electrical link to a receive processor. Transmit clock source 368 provides a clock 376 for the transmit buffer/controller 370 and optionally the encoders 378*a* through 378*h* at the data rate in use. For a system sending 10 Gb/s of data, TX Data 364 would clock 8 bytes of data at a rate of 156.25 Mhz into encoders 378 and serializer 386 via parallel clock 376. After encoding the data to a 10 bit width 380*a*, the serializer output stages 386 are clocked at 1.5625 Ghz. It is understood to one skilled in the art that the actual clocking speed of the interface as provided by generator 368 may be any frequency, as long as the serializer clock rate and transmit buffer output clocking rate are matched in throughput. Additionally, the encoders may be optionally clocked on input or output, or not at all, and the serializers may be optionally clocked on input or output, although best performance may be seen with clocking at each stage.

Figure 16:
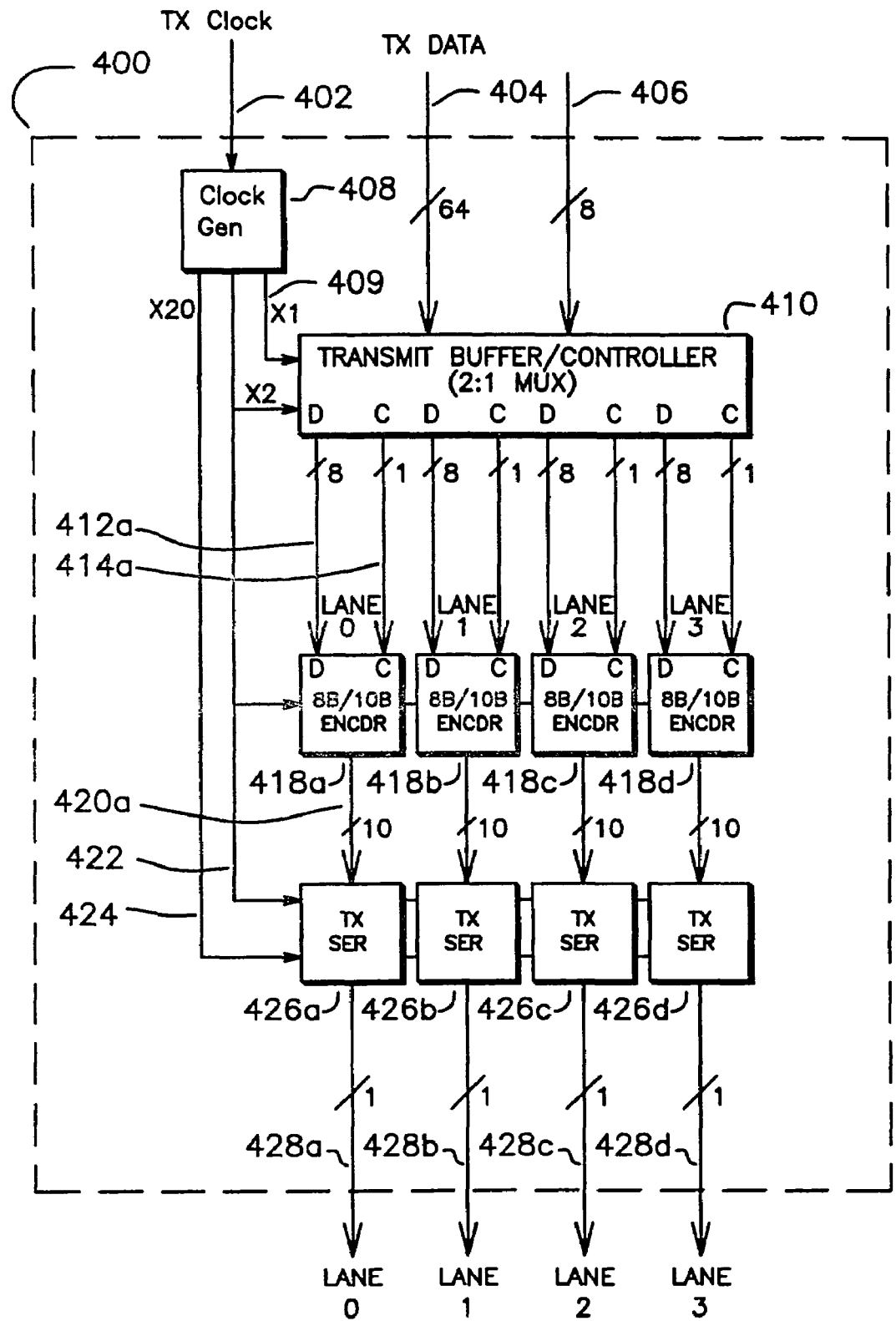
FIG. 16 is a 4 data lane transmit processor for the packet of FIG. 12.

FIG. 16 shows an alternate transmit processor for the case where the number of data lanes n=4, while the TX data input 404 rate remains constant. Transmit buffer 410 may accept 8 byte wide inputs on interface 404 accompanied by control/data bits 406, and perform a 2:1 multiplexing to distribute this input data and control across the 4 data lane wide interface. The operation of other elements of FIG. 16 is the same as the earlier FIG. 15, with the exception of clock generator 408, which for a 10 Gb/s input rate 404, is now clocking in TX data 404 with a 156.25 input clock 409, and is using a 312.5 Mhz input clock for control 414 and data 412 on lanes 0 to 3 to the encoders 418 and serializer inputs 426. The serializer 426 outputs are clocked using a 3.125 Ghz clocking rate 424. The output of this transmit processor is the 4 data lane data stream of FIG. 12. As is clear to one skilled in the art, many other such modification may be made to the transmit processor, including changing the number of data lanes to any value of one or more, whereby the level of multiplexing of the transmit buffer/controller 410 is related to the width of the input packet bus divided by the number of data lanes on the output side of the buffer/controller. For the case where n=1 and a 64 bit packet input is afforded, the input would be multiplexed 8:1, and only data lane 0 would be implemented, producing the output described in FIG. 14. For n=1, the transmit buffer would clock 8 byte data in at 156.25 Mhz, and send a single stream to the encoder, clocked into and out of the serializer at 1.25 Ghz. The serializer rate 422 would be 12.5 Ghz. As indicated earlier, any clocking rate could be used, as long as the throughputs are matched between stages.

Figures 17A, 17B:
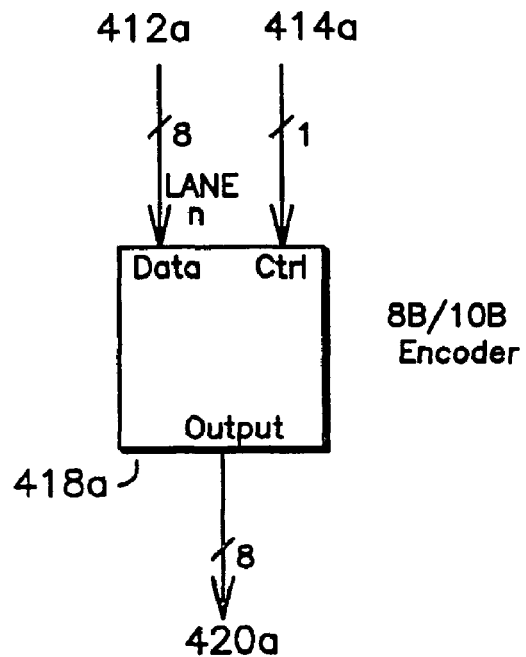

FIG. 17*a* shows the 8B/10B encoder in further detail. Data input 412*a* and control input 414*a* produce output 420*a* which is 10B encoded depending on the data and control inputs, as shown in FIG. 17*b*. For the control input 414 set to DATA, line 442 shows 8 bit input data directly encoded into 10 bit output data according to the method of U.S. Pat. No. 4,486,739. Line 440 shows the start transaction, wherein an 8B START input 412 and the control input 414 set to CTRL outputs a Start symbol selected from the available and unused 10B encodings. Similarly, lines 444, 446, 448, 449, and 450 show the control input 414 set to CTRL while END, IDLE_EVEN, IDLE_ODD, IDLE_EVEN_BUSY, and IDLE_ODD_BUSY are input as 8B data, which causes unique 10B symbols to be emitted which are reserved from the available and unused 10B encodings. There are many different such unique and unused 10B codings, and the best selections are made on the basis of running disparity and hamming distance from other codes. In the best mode the codings (in 10B descriptive format) are START K27.7
END K29.7
IDLE_EVEN K28.5
IDLE_ODD K23.7
IDLE_EVEN_BUSY K28.1.
IDLE_ODD_BUSY K28.0.

When the receive processor for this end of the link has a full receive buffer or is no longer capable of receiving additional data, it signals this to the transmitter on the opposite end of the link by emitting EVEN_IDLE_BUSY or ODD_IDLE_BUSY, as shown in lines 449 and 450.

Figure 18:
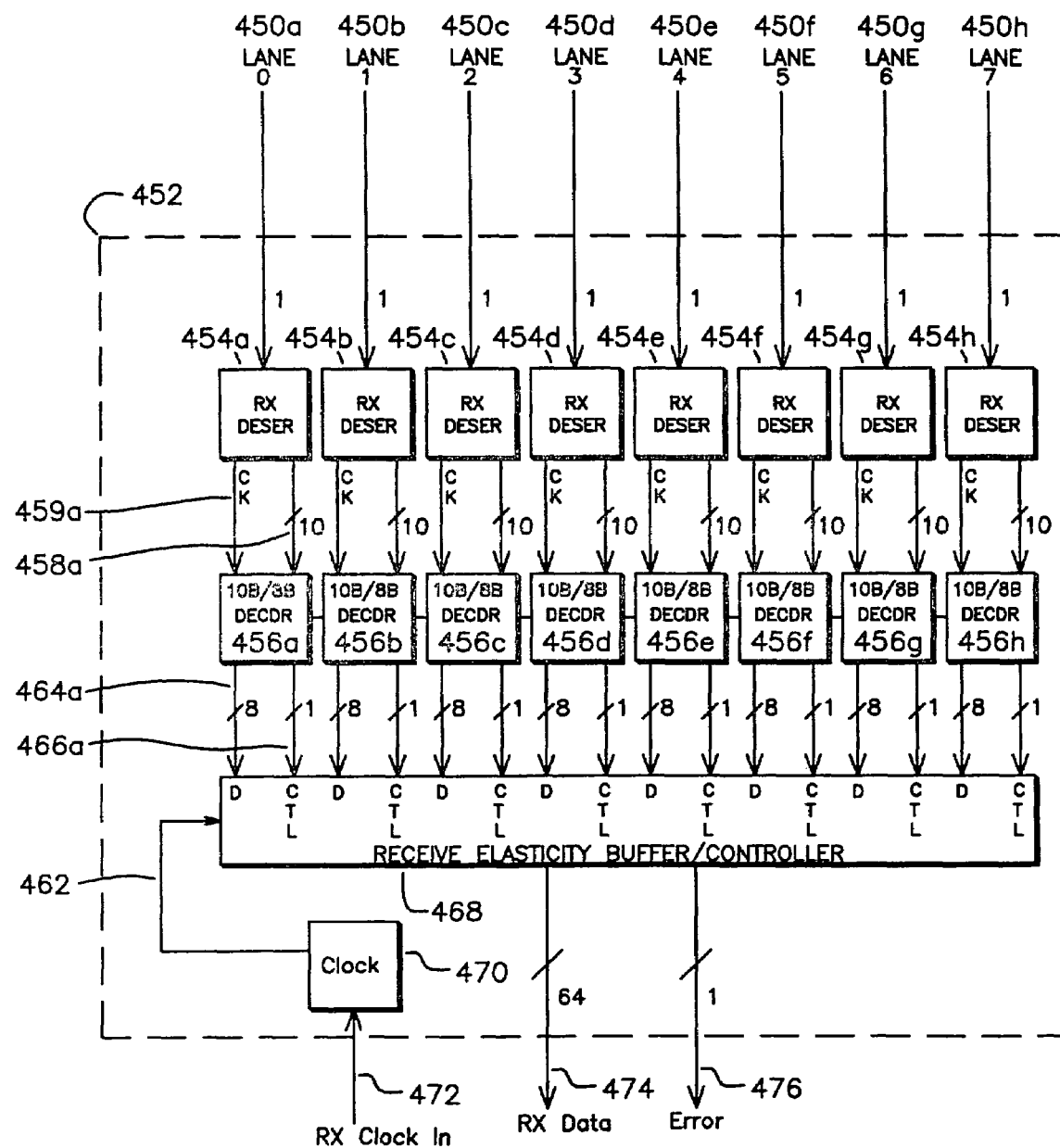
FIG. 18 is an 8 data lane receive processor for the packet of FIG. 11.

FIG. 18 shows the receive processor 452. Input data is applied as serial streams organized by data lane, shown as 450*a* through 450*h*. This data is applied to the receive deserializers 454*a* through 454*h*, which output 10 bit wide streams of data 458*a* through 458*h*, organized by data lane. These 10B streams are applied to the 10B/8B decoders 456*a* through 456*h*, which decode 8 bit data 464*a* through 464*h* and control information 466*a* through 466*h*, shown for lane 0 as 464*a* and 466*a* respectively, and repeated identically for all decoders 456*a* through 456*h*. Receive elasticity buffer/controller 468 accepts these inputs and organizes packet data to transfer to output port 474 based on receiving a control input 466*a* asserted with the data input 464*a* having the value START on lane 0, and header data on the remaining lanes 464*b* and 466*a* through 464*h* through 466*h*, followed by the data packet, followed by the control signal 466 asserted accompanied by data 464 having the value END on the appropriate data lane. Thereafter IDLE signals are received. The controller is able to extract a variety of error conditions, such as START appearing on a data lane other than 0, an improperly formed IDLE_EVEN, IDLE_ODD, IDLE_EVEN_BUSY, IDLE_ODD_BUSY or END transaction, and the like. These error conditions are signaled through error output 476. Each deserializer may locally recover a clock 459 for use in clocking the decoder 456. The receive elasticity buffer/controller also serves to isolate the clock domains between the input clocking rate controlled by the receive data speed whereby control 466 and data 464 signals enter the controller at rates determined by the link far-end sender and buffered data 474 is clocked out of the receive elasticity buffer by local system clock 472. While the receive clock domain boundary is shown in the elasticity buffer 468, it is clear to one skilled in the art that this boundary could be located anywhere in the receive processor. In the example shown in FIG. 18, data is clocked into decoders 456a-456h by recovered clock 459, which is locked to the frequency of the sending source using clock recovery methods well known in the art. Data is clocked out of the receive buffer by local clock 462, which is derived from system clock 472.

Figure 19:
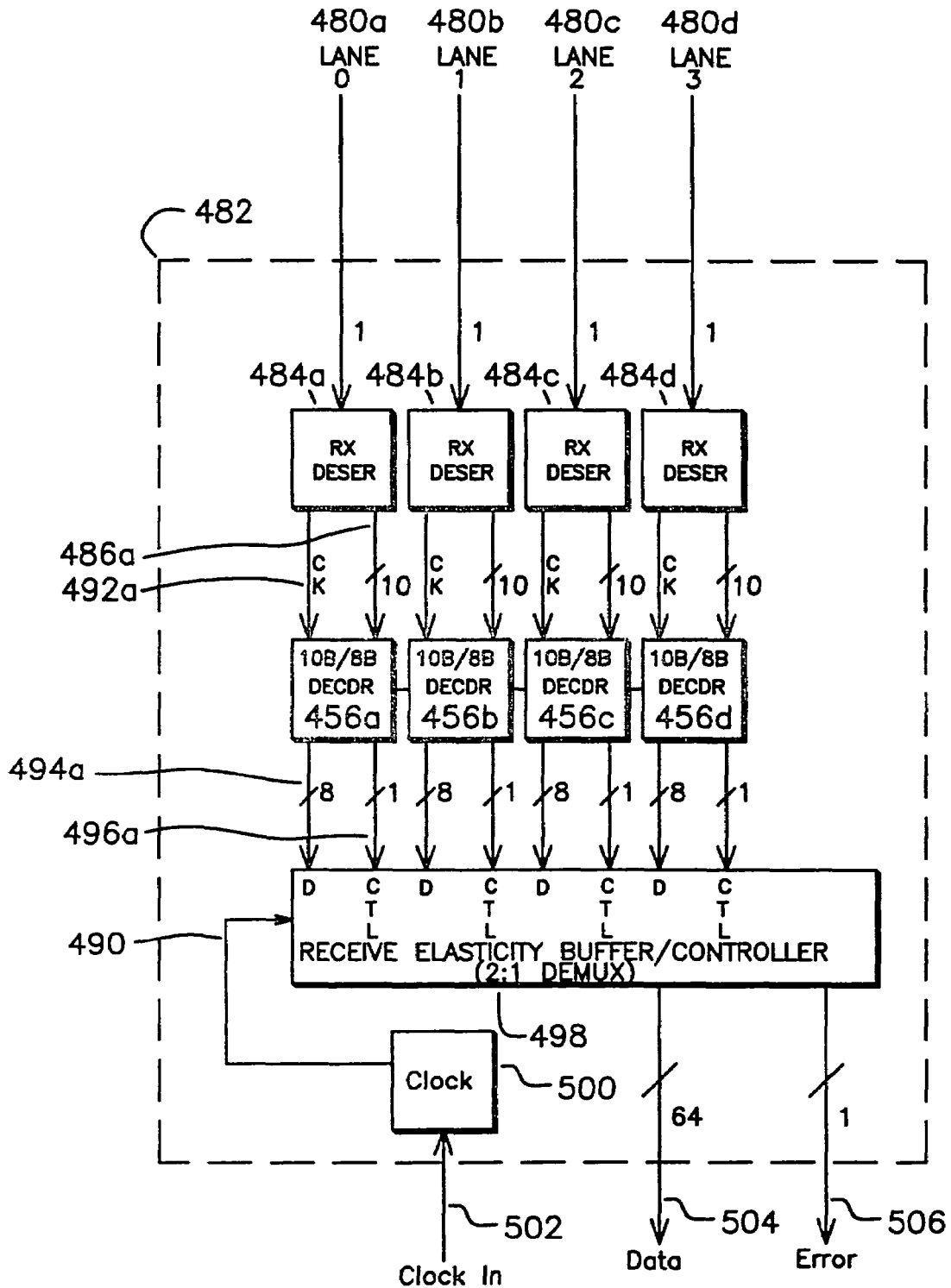
FIG. 19 is a 4 data lane receive processor for FIG. 12.

FIG. 19 shows the case where the receive processor has the number of data lanes n=4. This operates analogously to the receive processor of FIG. 18, except that the data rate of data presented to the receive buffer/controller on inputs 494 and 496 is doubled.

Figures 20A, 20B:
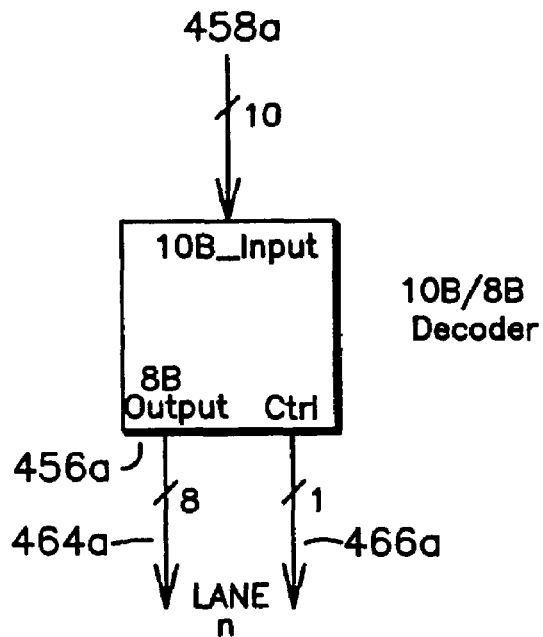

FIG. 20a shows the 10B/8B decoder. 10 bit parallel input 458a is converted to 8 bit output data 464a, and 1 bit control 466a. FIG. 20b shows the cases 470, 474, 476, 478, 480, and 482 for Start, End, Even_Idle, Odd_Idle, Even_Idle_Busy, and Odd_Idle_Busy respectively. Case 472 shows 10B input data decoded into 8B output data, and the control output signal asserted as type DATA.

In the manner described, data packets may be furnished to a controller, encoded into data lanes, serialized, and transmitted as clock-encoded data. These serial streams of byte-organized data may remotely deserialized, decoded, and re-assembled back into data packets for handling. Additionally, header information may optionally be pre-pended such that information required by the receiving equipment may be easily retrieved during the interval the data packet is being received. The above description of the high speed transmit and receive processors has been drawn to a particular implementation to afford a complete understanding of the invention as practiced in its best mode. Although the invention has been described through the best mode case, it is clear to one skilled in the art that there are many other ways of implementing the described invention. For example, while the figures describe receive and transmit processors having n=1 to n=8 data lanes, it is clear that an arbitrary number of channels would operate in the same manner, and that the parallel paths and codings do not need to be based on 8-bit bytes. Further, while the encoding and decoding of symbols is based on the standard method of 8B/10B coding of U.S. Pat. No. 4,486,739, other coding/decoding methods could be used. The transmit buffer/controller is shown as generating control signals which indicate the time that particular codes are to be emitted by the encoders, functions which could be performed by a separate controller. While the clocking rates have been chosen to illustrate a 10 Gb/s data rate for exemplar purposes, no such clock speed limitation should be inferred in the present invention, which offers the advantages described for any data rate or clocking speed.

We claim:

1. A communication interface having n data lanes, said interface having a controller for sequentially and contiguously transmitting a header including a packet type field describing a payload data type, said controller generating a header distributed across a plurality of said data lanes, said controller also generating a variable amount of payload data comprising an encapsulated packet having an encapsulated header and encapsulated data, said payload data distributed sequentially across said n data lanes by said controller;

said encapsulated header containing information unrelated to said packet header other than said packet type field;

a field check sequence computed over the entire said payload data, concatenated to the end of said payload, and distributed sequentially across said n data lanes by said controller;

said header includes transmitting a START symbol on first said data lane, and the transmission of said payload data is followed by said field check sequence distributed as bytes across said n data lanes and an END symbol on at least one said data lane;

said payload data includes transmitting successive data bytes canonically across said n successive data lanes up to data lane m, where m<=n;

an encoder coupled to each said data lane such that during intervals when said header or said payload is not being transmitted, each said encoder generates an alternating pattern of a first preamble symbol and a second preamble symbol distinct from said first preamble symbol across said n data lanes;

and said n>1.

2. The communication interface of claim 1 where said n is 4.

3. A process for transmitting data on a communications channel having a first, a second, a third, and a fourth data lane, each said data lane being 8 bits wide, said data comprising a header which includes a start symbol, payload type field, and variable length payload described by said payload type, said payload further having an encapsulated header and encapsulated payload, said variable length payload followed by a field check sequence computed on said header and also said payload, said field check sequence spanning all said data lanes, the channel transmitting said data on successive clock intervals by sequentially placing said data on said first, said second, said third and said fourth data lane during a particular said clock interval, said process comprising the steps:

a first step of sending a synchronization symbol on all four said data lanes until said variable length payload is ready to be transmitted and not sending said synchronization symbol again until all after all said variable length payload is transmitted, said synchronization symbol being an alternating succession of a first preamble symbol followed by a second preamble symbol distinct from said first preamble symbol;

a second step of substantially simultaneously sending said header to said first data lane and part of said payload to the remaining three said data lanes during a first said clock interval;

a third step of incrementally transmitting the remainder of said payload data in a sequence of transmission events, each said transmission event occurring during a said successive clock interval and comprising sending said incremental payload data distributed across said four data lanes followed by said field check sequence until unsent said field check sequence spanning one, two, or three lanes remains to be transmitted;

a fourth step of transmitting said unsent field check sequence by distributing it across said one, two, or three data lanes accompanied by an END symbol on one said data lane.

4. The process of claim 3 where no said unsent field check sequence remains and said END symbol is transmitted on said first data lane.

5. The process of claim 3 where no said unsent field check sequence remains and said END symbol is transmitted on said first data lane accompanied by said preamble transmitted on said second, said third, and said fourth data lanes.

6. The process of claim 3 where said unsent field check sequence is transmitted on said first said data lane and said END symbol is transmitted on said second data lane.

7. The process of claim 3 where said unsent field check sequence is transmitted on said first said data lane and said END symbol is transmitted on said second data lane accompanied by said preamble transmitted on said third and said fourth data lanes.

8. The process of claim 3 where said unsent field check sequence is transmitted on said first and said second data lanes and said END symbol is transmitted on said third data lane.

9. The process of claim 3 where said unsent field check sequence is transmitted on said first and said second data lanes and said END symbol is transmitted on said third data lane accompanied by said preamble transmitted on said fourth data lane.

10. The process of claim 3 where said unsent field check sequence is transmitted on said first, second, and third said data lanes and said END symbol is transmitted on fourth said data lane.

11. The process of claim 3 where said unsent field check sequence is transmitted on said first, said second, and said third data lanes and said END symbol is transmitted on said fourth data lane accompanied by said preamble transmitted on said fourth data lane.

12. The process of claim 3 where each said clock rate is substantially 312.5 Mhz.

13. The process of claim 3 where each said clock rate is 156.25 Mhz and both a both positive edge and a negative edge are used to transfer said data.

14. The process of claim 3 where each said clock rate is 312.5 Mhz and either a positive edge or a negative edge is used to transfer said data.

15. The process of claim 3 where each said data lane is encoded and serialized into a serial stream of data.

16. The process of claim 15 where said encoder is an 8B/10B encoder.

17. The process of claim 15 where said serial stream of data is transmitted as a differential electrical signal.

18. The process of claim 15 where said serial stream of data is transmitted as an optical signal.

19. A transmitter for sending data formed into streams of 8-bit bytes, the transmitter having a controller, said streams forming a header followed by a variable length payload, said data substantially simultaneously transmitted on a first data lane, a second data lane, a third data lane, and a fourth data lane in a succession of time sequences in the following manner:
   said controller sending a preamble on said first, said second, said third, and said fourth data lanes until said variable length data is ready to transmit, where said controller sending a preamble including sending the alternating sequence of a first preamble symbol and a second preamble symbol distinct from said first preamble symbol across said four data lanes, and when said data stream is ready to transmit:
   said controller sending a START symbol on said first data lane and said first three successive bytes of data from said stream on said second, said third, and said fourth data lanes during one said time sequence;
   said controller sending the remainder of said data stream by sending each subsequent four bytes of unsent data on said first, said second, said third, and said fourth data lanes during successive said time sequences until there is insufficient data to send on all four said data lanes, said insufficient data being final data;
   when there is no said final data to send, said controller sending said END symbol on said first lane, and said preamble on said second, said third, and said fourth lanes;
   when said final data comprises one said data lane, said controller sending said final data on said first lane, an END symbol on said second lane, and said preamble on said third and said fourth lanes;
   when said final data comprises two said data lanes, said controller sending said final data on said first and said second lane, an END symbol on said third lane, and said preamble on said fourth lane,
   when said final data comprises three said data lanes, said controller sending said final data on said first, said second, and said third lane, and an end symbol on said fourth lane.

20. The transmitter of claim 19 where each said data lane is 8 bits wide.

21. The transmitter of claim 19 where each said data lane is 8 bits wide and is clocked at a rate of 312.5 Mhz.

22. The transmitter of claim 21 where said 312.5 Mhz clock comprises both the positive edge and the negative edge of a 156.25 Mhz clock.

23. The transmitter of claim 21 where said 312.5 Mhz clock comprises a positive edge or a negative edge of said 312.5 Mhz clock.

24. The transmitter of claim 21 where each said data lane includes an encoder and a serializer, each said data lane generating a serialized stream of data.

25. The transmitter of claim 24 where each said data lane includes an encoder receiving data at said time sequence of substantially 312.5 Mhz, and each said serializer is clocked at a rate of 10 times said encoder time sequence rate.

26. The transmitter of claim 24 where each said encoder uses 8B/10B encoding.

27. The transmitter of claim 21 where each said data lane comprises 8 bits of data and one bit of clock, said clock operating at a rate of substantially 312.5 Mhz.

28. The transmitter of claim 24 where data from each said data lane is transmitted least significant bit first and most significant bit last.

29. The transmitter of claim 24 where data from each said data lane is transmitted most significant bit first and least significant bit last.

30. A transmitter for generating four streams of serial data, said transmitter including:
   a transmit buffer for receiving sequential data and a separator for separating said sequential data into four data lanes, said data having, in sequence, a header including a payload type field, a payload which includes an encapsulated header and encapsulated packet of a type described by said payload type field, and a field check sequence computed from said header and said payload, each said data lane comprising 8 bits of data and a clock operating at substantially 312.5 Mhz;
   said separator generating said four data lanes by prepending a START delimiter to the beginning of said sequential data and appending an END delimiter to the end of said sequential data, thereafter forming a succession of four bytes of unsent sequential data and applying each of said four bytes of unsent sequential data to a particular said data lane, said four bytes of unsent sequential data applied at substantially the time;
   each data lane having:
   an encoder for converting said 8 bits of data accompanied by said clock into 10 bits of encoded data;
   a serializer for transmitting said 10 bits of encoded data into a stream of serial data clocked at 10 times said encoder clock rate;
   said encoder generating an alternating pattern of an even preamble symbol and an odd preamble symbol to indicate across said four data lanes when said START delimiter, said sequential data, and said END delimiter are not being transmitted.

31. A receiver for receiving four streams of serial data and converting said four streams of serial data into a variable length packet, said receiver comprising:
- four deserializers, each said deserializer coupled to a respective serial stream, each said deserializer converting said stream of serial data into 10 bits of encoded data accompanied by a clock for each said serial stream, said deserializer synchronizing to the alternating sequence of a first preamble symbol followed by a second preamble symbol distinct from said first preamble symbol;
- four decoders, each said decoder coupled to a respective said deserializer output, each said decoder converting each said 10 bits of encoded data into 8 bits of decoded data, thereby producing 8 bits of decoded data accompanied by a clock;
- an elasticity buffer coupled to each said 8 bit decoder data and decoder clock, said elasticity buffer receiving 8 bits of data from each decoder at a rate of substantially 312.5 Mhz, and combining said decoder clock and data to form 32 bits of output data over successive intervals,
- a packet generator coupled to said elasticity buffer output data and responsive to a START delimiter on a particular one of said four streams and an END delimiter on any said stream, where said END delimiter is accompanied by preamble symbols on at least one other stream, said packet generator forming said packet including a header, a payload, and a field check sequence by canonically concatenating data received from a first stream, second stream, third stream, and fourth stream into said stream of 32 bits of data, said packet header containing a type field which identifies a particular type of said packet payload, said packet payload including an encapsulated header and an encapsulated payload;
- where said packet header describes said packet payload type but does not include information derived from either said encapsulated header or said encapsulated payload of said packet payload.

32. The receiver of claim 31 where said decoder is an 8B/10B decoder.

33. The receiver of claim 31 where said variable length payload is formed using data received on the other three said decoders following a START symbol on one said decoder, thereafter using data from all four said decoders until receipt of an END symbol on any said decoder.

34. The receiver of claim 31 where said variable length payload is formed using data between a START symbol on one said decoder and an END symbol received on any said decoder.

35. The receiver of claim 31 where said elasticity buffer forms said variable length payload by concatenating data received from a first decoder, a second decoder, a third decoder, and a fourth decoder, where a START symbol is received on a first decoder and said variable length packet is formed from concatenating said data in sequence from said second decoder, said third decoder, said fourth decoder, and said first decoder, repeating until terminated by the receipt of an END symbol on any decoder.

36. The receiver of claim 31 where each said serial stream of data is derived from a differential electrical signal.

37. The receiver of claim 31 where each said serial stream of data is derived from an optical signal.

38. The receiver of claim 31 where said 312.5 Mhz clock is the result of using both the rising edge and falling edge of a 156.25 Mhz clock.

39. A process operative on a receive processor which generates a variable length packet from four streams of serial data, the process comprising:
- deserializing each said serial stream into 10 bit encoded data, thereafter converting said 10 bit encoded data into four data lanes of 8 bit data, and forming a variable length packet as follows, said deserializer synchronizing said four data lanes using the alternating sequence of a first preamble symbol followed by a second preamble symbol distinct from said first preamble symbol, said alternating sequence present said four data lanes:
- a first step of receiving a START symbol on said first data lane and said ordered variable length data on said second, said third, and said fourth data lanes during one said time sequence;
- a second step of receiving the remainder of said variable length payload on said first, said second, said third, and said fourth data lanes during successive said time sequences until an END symbol is detected on one of said data lanes accompanied by payload data on at least one data lane and a preamble on at least one other data lane;
- a third step of forming a variable length packet from said data from said START symbol to said END symbol, also maintaining the order of said data received on said first, said second, said third, and said fourth data lanes;
- a fourth step of extracting a packet header including a packet type and a payload identified by said packet header type;
- a fifth step of extracting an encapsulated header and an encapsulated packet from said payload according to said packet header type, where said packet header is unrelated to said extracted encapsulated header, and said packet header only identifies the type of said encapsulated header and said encapsulated packet.

40. The process of claim 39 where each said decoder is a 10B/8B decoder.

41. The process of claim 39 where each said 8 bit wide data lane is clocked at substantially 312.5 Mhz.

42. The process of claim 39 where each said data lane is clocked at substantially 1/10th the rate of each said serial data.

43. The process of claim 41 where said 312.5 Mhz clock comprises using either the rising edge or the falling edge of a 312.5 Mhz clock.

44. The process of claim 41 where said 312.5 Mhz clock comprises using both the rising and falling edge of a 156.25 Mhz clock.

45. The process of claim 39 where each said serial stream of data is derived from a differential electrical signal.

46. The process of claim 39 where each said serial stream of data is derived from an optical signal.

* * * * *